United States Patent [19]

Dunn et al.

[11] Patent Number: 5,604,616
[45] Date of Patent: Feb. 18, 1997

[54] DUAL FUNCTION ELECTRO-OPTICAL DISPLAY DEVICE EXHIBITING A BISTABLE IMAGE OR A FUGITIVE IMAGE DEPENDING THE APPLIED VOLTAGE

[75] Inventors: Patrick M. Dunn, Plantation; Thomas J. Swirbel, Davie, both of Fla.

[73] Assignee: Motorola, Inc., Schaumburg, Ill.

[21] Appl. No.: 415,901

[22] Filed: Apr. 3, 1995

[51] Int. Cl.$^6$ ....................................... G02F 1/13
[52] U.S. Cl. ............................ 349/168; 349/175
[58] Field of Search ........................ 359/90, 101

[56] References Cited

U.S. PATENT DOCUMENTS

| | | | |
|---|---|---|---|
| 3,977,769 | 8/1976 | Tsukamoto et al. | 359/90 |
| 4,461,715 | 7/1984 | Lu et al. | 252/299.1 |
| 4,547,309 | 10/1985 | Mochizuki et al. | 359/90 |
| 5,093,741 | 3/1992 | Shohara et al. | 359/90 |
| 5,274,484 | 12/1993 | Mochizuki et al. | 359/90 |
| 5,422,033 | 6/1995 | Mochizuki et al. | 359/90 |

*Primary Examiner*—Anita Pellman Gross
*Attorney, Agent, or Firm*—Dale W. Dorinski

[57] ABSTRACT

A dual function electro-optical display device operates as a bistable display when driven at one voltage, and operates as a nematic display when driven at another voltage. In the first mode, the image in the display zone is formed by applying a first electrical signal to the device, and the image persists upon removal of the first electrical field. In the second mode, the image is formed by applying a second electrical signal to the device, and the image disappears upon removal of the second electrical signal. In a liquid crystal display, the liquid crystal fluid (9) is a blend of at least one liquid crystal nematic compound and at least one liquid crystal cholesteric compounds, and is maintained in a gap (4) between two substrates (1).

24 Claims, 2 Drawing Sheets

DUAL FUNCTION ELECTRO-OPTICAL DISPLAY DEVICE EXHIBITING A BISTABLE IMAGE OR A FUGITIVE IMAGE DEPENDING THE APPLIED VOLTAGE

TECHNICAL FIELD

This invention relates in general to electro-optical display devices, and in particular to liquid crystal displays.

BACKGROUND

In a liquid crystal display (LCD) device, the application of a voltage changes the molecular orientation of the liquid crystal fluid, and the resulting change in optical characteristics such as double refraction, optical rotation, dichroism, or optical scattering, caused by the reorientation, is converted to a visible change. In other words, the LCD is a passive display device that utilizes the modulation of light within a liquid crystal cell. The liquid crystal cell is constructed with a layer of liquid crystal about 10 μm thick sandwiched between two glass substrates on which are formed transparent electrodes, and a molecular orientation film is formed on the surface of the electrode to impart a fixed orientation to the liquid crystal molecules.

The most widely used type of LCD is the nematic-type display (sometimes called twisted nematic or TN), in which the liquid crystal molecular orientation is twisted about 90° between the electrodes. This twisted molecular orientation disappears under the application of a voltage, and by putting the liquid crystal cell between crossed polarizing elements, bright and dark appearances can be obtained by applying or removing the voltage. This switching in normal TN or STN displays usually has a transition time on the order of milliseconds to hundreds of milliseconds. The liquid crystals used in TN displays are principally biphenyl, phenylcyclohexane and cyclohexylcarboxylic esters nematic liquid crystals. Nematic type LCD's operate at typical voltages between 1–5 volts, and have become quite popular, finding many uses in industrial, military and consumer products.

Another type of LCD uses cholesteric liquid crystals (e.g. fatty acid esters of cholesterol) to form a bistable device. A bistable optical device is one which can exist in either of two stable states of optical transmission. As in the TN display, the image is formed of bright and dark areas that are created by applying a voltage to the electrodes. However, unlike the TN display, the image does not disappear when the electrical field is removed, but persists for a period of time. The cholesteric display is thus said to exhibit bi-stability, which means that when a pixel is pulsed with a voltage, the pixel will stay "on", even after the voltage is turned off, until the pixel is turned off by a pulse of a different (typically lower) voltage. One disadvantage of this type of display is that it only operates at high voltages, usually in the range of 30–40 volts. This type of display has found very limited application, because the image formed is not easily removed, thus limiting its usefulness.

These two types of devices can roughly be classified into nematictype devices and bistable-type devices. It might be advantageous if one were able to combine the desirable features of the TN display with the desirable features of the bistable display.

DETAILED DESCRIPTION OF THE PREFERRED EMBODIMENT

Figure 1:
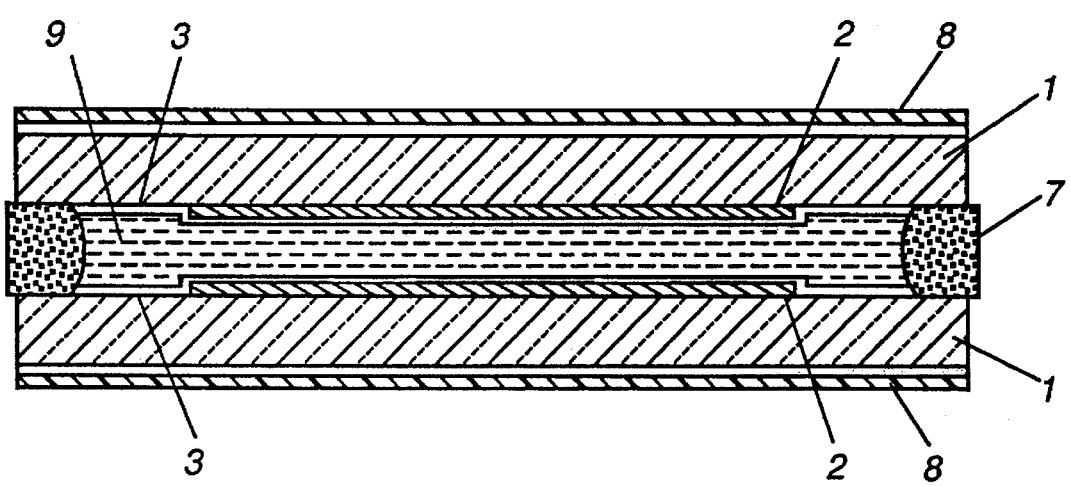
FIG. 1 is a cross-sectional view of a liquid crystal display in accordance with the invention.

While the specification concludes with claims defining the features of the invention that are regarded as novel, it is believed that the invention will be better understood from a consideration of the following description in conjunction with the drawing figures.

Referring now to FIG. 1, a schematic cross-sectional view of a typical LCD is intentionally drawn to an exaggerated scale to better illustrate the features of the invention. The inside surfaces of two substrates 1, made of transparent materials, face each other. The faces 3 of each substrate have an electrode film 2 located thereon to form a plurality of display elements in the visual display zone. A gap 4 is maintained between the two substrates, and the edges of the substrates are sealed with a sealant material 7 to close the gap. A liquid crystal material 9 fills the gap between the two substrates. The liquid crystal material 9 has an optical property wherein the long axes of the liquid crystal molecules are parallel to the individual elements of the electrode patterns on one substrate and are at right angles to the electrode patterns of the other substrate. The outside surface of at least one substrate is coated with a polarizer 8 having a polarizing axis corresponding to the orientation direction of the liquid crystal molecules. A second polarizer may optionally be located below the other substrate and a reflective plate (not shown) may also be used. Incident light from a front side of the LCD is polarized by the polarizer 8 and is rotated approximately ninety degrees by the liquid crystal material 9. When voltage is applied to selected electrodes on each substrate, the liquid crystal material 9 changes its optical rotation and changes the direction of the polarized light passing through the LCD, such that a portion becomes dark and a pattern representative of the selected electrodes is displayed.

Figure 2:
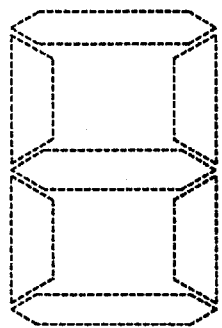
FIG. 2 is a plan view of a seven segment figure prior to application of voltage to the display.
Figure 3:
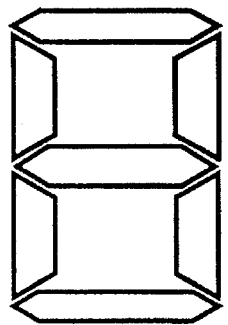
FIG. 3 is a plan view of a seven segment figure after application of the first threshold voltage to the display, in accordance with the invention.
Figure 4:
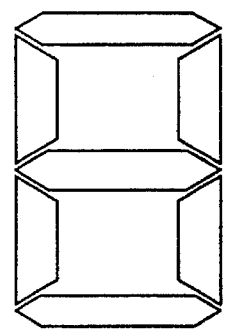
FIG. 4 is a plan view of a seven segment figure after application of the second threshold voltage and reapplication of the first threshold voltage to the display, in accordance with the invention.

Most LCDs, whether nematic or cholesteric, contain a mixture of nematic liquid crystal and cholesteric liquid crystal. The cholesteric material is necessary to give the nematic material a preferred twist direction, and the percentage of cholesteric material in a typical nematic type display is very low, usually around 0.05%. In contrast, a cholesteric type display contains a concentration of cholesteric material which is much higher, typically in excess of 40%. The dual function display of the instant invention is a novel class of display that exhibits the characteristics of both the nematic or TN display and the cholesteric or bistable display. The cell construction for this class of display is similar to that of conventional displays, in that two electrode plates are set at a distance, typically in the range of 4 to 10 microns, with the liquid crystal fluid disposed between them. Similar to the previous display classes, a mixture of both nematic and cholesteric materials is used as the fluid medium. However, in the instant invention, the range of cholesteric fluid is between about 0.3 and 10%, with the nematic fluid making up the remainder. The unique property of this display is that it has two distinct threshold voltages. The first threshold voltage is in the range typically used for TN displays, that is, between 1 to 5 volts. The second threshold voltage is between 15 and 25 volts. Referring now to FIG. 2, the electrode pattern for a seven segment figure commonly used in LCDs is shown. Those skilled in the art will appreciate that other configurations or patterns may also be employed, such as icons or matrices. When there is no voltage applied to the display, the liquid crystal material is not disturbed, and the display is transparent, as represented by the dashed lines of the figure, indicating that the segments are transparent. When the dual function display is pulsed at a voltage above the first threshold voltage and below the second threshold voltage (e.g., between 5–15 volts), the device operates like a traditional TN display to create a darkened image, as represented by the heavy black lines in FIG. 3. The electrical field applied to the electrodes reorients the liquid crystal material at that location to produce an image. When the voltage is removed, the image disappears, and the appearance of the display reverts back to that shown in FIG. 2. However, when a voltage greater than the second threshold voltage is applied (e.g. >15 volts), the liquid crystal reorients itself to a second stable state, similar to that of a traditional bistable device, thus forming an image. This image is said to be in a "frozen" or "captive" state. When this second voltage is removed, the image remains until it is altered by energizing with another external force. The appearance of this bistable image is similar to that of the nematic image, and is represented by the display figure shown in FIG. 3. Additionally, after forming the image, if a voltage greater than the first threshold voltage but lower than the second threshold voltage, or at a different frequency that the first threshold voltage, is applied to the LCD, the liquid crystal again reorients, resulting in an image which becomes a different shade or different color, as represented by the somewhat lighter line widths shown in FIG. 4. Once this voltage is removed, the liquid crystal and the image will return to the original "frozen" image shown in FIG. 3. The various voltage levels are easily applied from a data generation means such as an LCD driver module that provides signals at appropriate voltage levels to the LCD to correspond to the desired modes of operation.

To achieve this result, an admixture of liquid crystal fluids is formed of a nematic liquid crystal material having between 0.5% and 10% of left handed cholesteric liquid crystal material. In the preferred embodiment of the dual function display, the amount of cholesteric material in the fluid is about 0.5%, or roughly ten times the amount normally used in a TN display. The nematic liquid crystal used was part No. TN-7679 obtained from Roche, Inc., and the cholesteric liquid crystal material used was part No. ZLI-811 obtained from Merck & Co.. The gap between the substrates of the display was 10 microns. The polyimide alignment layer was formed from 2555T obtained from E.I. DuPont de Nemours Co., and the front and rear rub directions in the alignment layer were perpendicular to each other. The polarizers were adjusted such that a black on white or positive mode display was achieved. The display operated in a normal TN mode when pulsed above the first threshold voltage of approximately 2.5 volts (but below the second threshold voltage of approximately 20 volts) to produce a result similar to that shown in FIG. 3. When this first threshold voltage was removed, the image disappeared. When a voltage above the second threshold of approximately 20 volts was applied, the image formed and remained "frozen" even after the voltage was removed. Finally, when the first voltage (approximately 2.5 volts) was reapplied to the "frozen" image, the figure changed shade to become lighter. When this voltage was removed, the image returned to the original "frozen" image. As a practical application, if one pixel group is frozen to a certain shade or color, another pixel group in the same display can operate normally as a TN. Likewise, the "frozen" pixel group can still operate as a TN, but will have a different background color when the voltage is turned off. To completely remove the image "frozen" image after applying the second voltage the image was heated above the isotropic temperature of the liquid crystal fluid (>85° C.), thereby converting the liquid crystal medium from anisotropic to isotropic. The heating step can be accomplished by an integral heater or external heater.

In summary, a novel dual function liquid crystal display has been formed that operates in two modes. In the nematic mode, a fugitive image is formed that disappears when the driving voltage is removed. In the cholesteric mode, a persistent image is formed that remains when the driving voltage is removed. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A dual function electro-optical display device, comprising:

a liquid crystal medium having at least two possible light modulating modes, a first nematic mode being responsive to a first voltage to form a fugitive image, and a second cholesteric mode being responsive to a second voltage to form a persistent image.

2. The device of claim 1, wherein the fugitive image disappears when the first voltage is removed.

3. The device of claim 1, wherein the persistent image remains when the second voltage is removed.

4. The device of claim 1, wherein the liquid crystal medium comprises at least one liquid crystal nematic compound and at least one liquid crystal cholesteric compound.

5. The device of claim 4, wherein the liquid crystal medium comprises nematic liquid crystal material having between 0.3% and 10% of left handed cholesteric liquid crystal material.

6. The device of claim 1, wherein the persistent image is removed by changing the liquid crystal medium from anisotropic to isotropic.

7. The device of claim 6, wherein the persistent imaged is removed by heating liquid crystal medium to a temperature in excess of 85° C.

8. A dual function liquid crystal display, comprising:

a liquid crystal display that exhibits the characteristic of being operable as a bistable display when driven at a first voltage, and operable as a nematic display when driven at a second voltage.

9. The dual function liquid crystal display of claim 8, further comprising a liquid crystal medium comprising at least one liquid crystal nematic compound and at least one liquid crystal cholesteric compound.

10. The dual function liquid crystal display of claim 9, wherein the liquid crystal medium comprises nematic liquid crystal material having between 0.3% and 10% of left handed cholesteric liquid crystal material.

11. The dual function liquid crystal display of claim 8, further comprising:

plural display elements having plural electrodes arranged to define a visual display zone; and data generation means for generating first and second signals to the plural electrodes, said signals having voltage levels which vary in correspondence to selected modes of operation of the display.

12. The dual function liquid crystal display of claim 11, wherein the first voltage is greater than the second voltage.

13. The dual function liquid crystal display of claim 12, wherein the first voltage comprises about 20 volts.

14. The dual function liquid crystal display of claim 12, wherein the second voltage comprises about 5 volts.

15. A dual function liquid crystal display, comprising:
   a liquid crystal display having a liquid crystal medium comprising a mixture of between 90–99.7% of a nematic liquid crystal material and between 0.3–10% of a cholesteric liquid crystal material; and
   said liquid crystal display exhibiting the characteristic of being operable as a bistable display when driven at a voltage in excess of 20 volts, and operable as a nematic display when driven at a voltage less than 15 volts.

16. A dual function electro-optical display device, comprising:
   an electro-optical display device that provides an image;
   a first portion of said image formed by applying a first electrical field to the device, said first portion of said image persisting upon removal of said first electrical field; and
   a second portion of said image formed by applying a second electrical field to the device, said second portion of said image disappearing upon removal of said second electrical field.

17. The device of claim 16, wherein the first portion of said image is altered when the second electrical field is applied.

18. The device of claim 17, wherein the altered image reverts to the original image when the second electrical field is removed.

19. The device of claim 16, wherein the first and second portions comprise the same image.

20. The device of claim 16, wherein the first and second portions comprise two different images.

21. The device of claim 16, wherein the image is removed by imposing a third electrical field, the third field being less than the first field and at a different frequency than the first field.

22. In an electro-optical display device including a first substrate having an optically transmissive and electrically conducting coating on a face thereof, a second substrate having an electrically conductive coating on a face thereof, said substrates being positioned such that the coatings are adjacent and substantially equidistantly spaced, a light source means positioned to direct light toward the substrates, a liquid crystal composition occupying a space between said coatings, and means for impressing a voltage between selected portions of said coatings, the display characterized by said liquid crystal composition exhibiting a nematic response to a first voltage of less than 10 volts to form a fugitive image which vanishes when the first voltage is removed, and exhibiting a bistable response to a second voltage of greater than 15 volts to form a persistent image which remains when the second voltage is removed.

23. The device of claim 22, wherein the liquid crystal composition comprises at least one liquid crystal nematic compound and at least one liquid crystal cholesteric compound.

24. The device of claim 22, further comprising data generation means for generating first and second signals to the electrically conductive coatings, said signals having voltage levels which vary in correspondence to the mode of operation of the display.

* * * * *